C. C. ROSS.
GLASS TANK.
APPLICATION FILED JULY 26, 1910.
1,027,282.
Patented May 21, 1912.
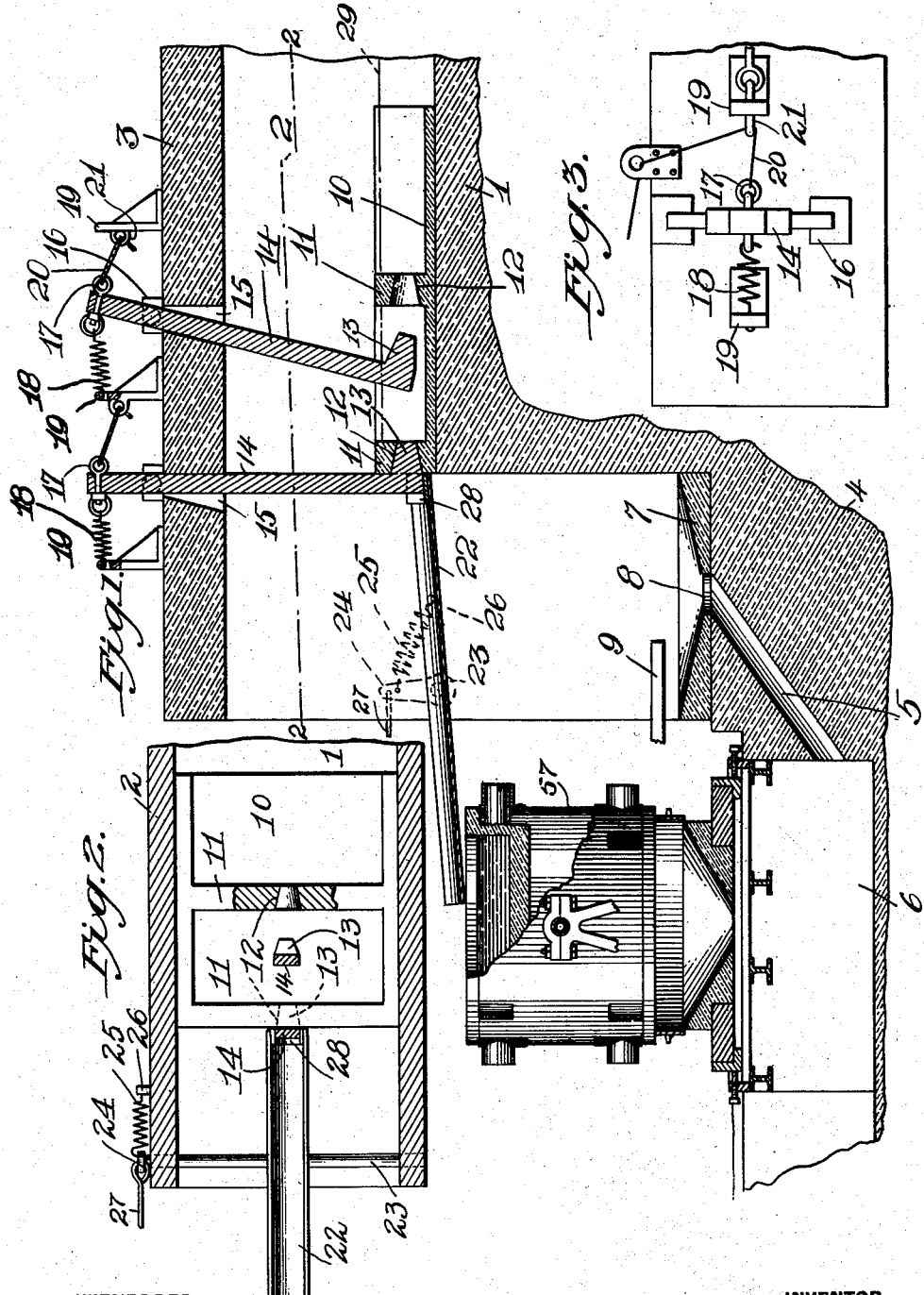
WITNESSES
INVENTOR
C. C. Ross.
by Attorneys.

UNITED STATES PATENT OFFICE.

CHARLES C. ROSS, OF NEW KENSINGTON, PENNSYLVANIA.

GLASS-TANK.

1,027,282. Specification of Letters Patent. Patented May 21, 1912.

Application filed July 26, 1910. Serial No. 573,898.

*To all whom it may concern:*

Be it known that I, CHARLES C. ROSS, a citizen of the United States of America, residing at New Kensington, in the county of Westmoreland and State of Pennsylvania, have invented certain new and useful Improvements in Glass-Tanks, of which the following is a specification, reference being had therein to the accompanying drawing.

This invention relates to glass tanks for the manufacture of window glass and more particularly to the tank mechanism employed in making that class of sheet glass produced from a cylinder that is blown, capped, slit, and then spread to form a sheet.

The primary object of the invention is to provide in a manner as hereinafter set forth, a novel means for maintaining molten glass in proper condition whereby a large quantity or batch can be carried, provision being made for a fresh supply of molten glass after each gathering.

In the drawings: Figure 1 is a longitudinal sectional view of a portion of the tank, showing the pot in elevation, partly broken away and partly in section. Fig. 2 is a horizontal sectional view taken upon the line 2—2 of Fig. 1, and Fig. 3 is a plan view of a portion of the tank.

The glass tank has a suitable foundation 1, side walls 2 and a roof 3, and this structure is adapted to contain the molten glass from which the cylinders are made. The greater part of the tank, particularly the burners for retaining the contents thereof in a molten and fluid condition is of the ordinary form, and at the rear end of the tank, from which the molten glass is withdrawn, the foundation 1 is lower, as at 4 and provided with an angularly disposed opening 5 terminating in a waste pit 6. Upon the lower foundation 4 is placed a basin 7 having a central opening 8 in communication with the opening 5, and arranged over the basin 7 is a gas burner 9 adapted to receive gas under pressure and retain the contents of the basin 7 in a molten and fluid condition, whereby the contents will flow into the waste pit 6.

Upon the foundation or floor of the tank 2 at the rear end thereof is arranged a trough 10 extending from one of the side walls 2 to the opposite wall. This trough is provided with two partitions 11 having longitudinal conical-shaped openings 12 formed therein. Adapted to close said openings are conical-shaped valves or plugs 13 carried by valve levers 14 extending upwardly through openings 15 provided therefor in the roof 3 of the tank. The valve levers 14 are trunnioned between bearings 16 mounted upon the roof 3 at the sides of the opening 15. The upper ends of the valve levers 14 are provided with double eye-bolts 17, said eye-bolts being connected by retractile springs 18 to brackets 19 arranged upon the roof 3. The eye-bolts 17 are also provided with cables 20 passing through eyes 21, carried by the brackets 19, and it is only necessary to pull upon the cables 20 to open the valves and allow the contents of the trough 10 to pass from the tank 2.

The contents of the trough 10 are received by a semi-cylindrical spout 22 trunnioned in the side walls 2 of the tank at the rear end thereof, one of the trunnions 23 extending through the side wall 2 and being provided with a crank 24. This crank is connected by a retractile spring 25 to a pin 26, carried by the outer side of the wall 2. The crank 24 is also connected to an operating cable 27, and when this cable is released the tension of the spring 25 is released and the spout 22 is tilted, the inner end of the spout being lowered by the opening 12 of the trough 10. The inner end of the spout 22 is prevented from raising above the outer opening 12 of the trough 10 by a U-shaped mouth-piece 28 carried by the trough 10.

The two compartments shown in the trough 10 are designed for the accommodation of the two valves 13. The innermost valve is normally maintained in an open position as shown in Fig. 1. The use of two compartments and valves is designed for the safety of the device and prevents the tank from being rendered entirely useless should anything happen to one of the valves. The innermost valve permits the outer valve being removed and renewed without closing down the operation of the tank and also the innermost valve may be employed in lieu of the outer valve whenever desirable and in the event that anything should happen to the outer valve, the inner valve is immediately closed thereby preventing the glass from flowing from the tank and wasting, it being noted that these valves are ordinarily constructed of such a material as fireclay and often become broken or burned out.

The molten glass that drips from the mouth-piece 28 and the spout 22 is caught by the basin 7 and conveyed to the waste pit 6, and it is from this pit that the waste glass can be returned to the tank 2 and again reduced to a molten and fluid condition.

The tank and those parts thereof subjected to the action of molten glass are made of non-fusible material, as fire-brick, fire-clay and metal.

The level of molten glass within the tank 2 has been indicated by the dot and dash line 29, and this level is maintained by the attendant of the tank, whereby glass will not overflow the trough 10.

Over the waste pit 6 is arranged an invertible pot 57 into which the molten glass is discharged by the spout 22. The glass is gathered from the pot 57.

What I claim, is:

1. A glass tank including a bottom and a roof, one portion of the bottom arranged at a lower level than the other portion, said roof provided with openings, a trough seated upon the higher portion of said bottom and having a plurality of glass containing compartments each provided with an outlet opening, shiftable plugs for closing said openings, means extending through the openings in the roof and engaging with the plugs for shifting them to permit of discharge of the glass from the compartments, a spout extending in the tank and adapted to be shifted for the reception of the glass as the latter is discharged from the trough, a collecting basin for drippings mounted upon the lower portion of said bottom, a waste pit, and means whereby communication is established between the basin and the waste pit.

2. A glass tank including a bottom and a roof, one portion of the bottom arranged at a lower level than the other portion, said roof provided with openings, a trough seated upon the higher portion of said bottom and having a plurality of glass containing compartments each provided with an outlet opening, shiftable plugs for closing said openings, means extending through the openings in the roof and engaging with the plugs for shifting them to permit of discharge of the glass from the compartments, a spout extending in the tank and adapted to be shifted for the reception of the glass as the latter is discharged from the trough, a collecting basin for drippings mounted upon the lower portion of said bottom, a waste pit, means whereby communication is established between the basin and the waste pit, and heating means arranged in the tank for the drippings.

3. A glass tank including a bottom and a roof, one portion of the bottom arranged at a lower level than the other portion, a trough seated upon the higher portion of the bottom and having a plurality of glass containing compartments each provided with an opening, shiftable plugs for closing said openings, means for shifting the plugs to permit of discharge of the glass from the compartments, means for conducting the discharged glass from the trough, a collecting basin mounted upon the lower portion of said bottom, and means whereby communication is established between the basin and a waste pit.

4. A glass tank including a bottom and a roof, a trough seated upon said bottom and provided with a plurality of glass containing compartments arranged one in advance of the other and each provided with an outlet opening, the rearmost compartment discharging into the forward one, shiftable plugs for closing said openings, means extending through the roof and engaging with the plugs for shifting them to cause a discharge of the glass from the compartments, and a spout extending in the tank for conducting the glass discharged from the trough.

5. A glass tank including a bottom and a roof, a trough seated upon said bottom and provided with a plurality of glass containing compartments arranged one in advance of the other and each provided with an outlet opening, the rearmost compartment discharging into the forward one, shiftable plugs for closing said openings, means extending through the roof and engaging with the plugs for shifting them to cause a discharge of the glass from the compartments, a spout extending in the tank for conducting the glass discharged from the trough, and means within the tank and forwardly of the trough for collecting the drippings as the glass enters the spout.

6. A glass tank including a bottom and a roof, one portion of the bottom arranged at a lower level than the other portion, a trough seated upon the higher portion of said bottom and provided with a plurality of glass containing compartments one arranged in advance of the other, each of said compartments provided with an outlet opening, the rearmost compartment discharging into the forward one, shiftable plugs for closing said openings, means extending through the roof of the tank and engaging with the plugs for shifting them from the openings to cause a discharge of the glass, a spout extending in the tank for the reception of the glass discharged from the trough, and means mounted upon the lower portion of the bottom for collecting the drippings as the glass is discharged from the trough into the spout.

7. A glass tank including a bottom and a roof, one portion of the bottom arranged at a lower level than the other portion, a trough seated upon the higher portion of said bottom and provided with a plurality of glass containing compartments one arranged in advance of the other, each of said compartments provided with an outlet opening, the rearmost compartment discharging into the forward one, shiftable plugs for closing said openings, means extending through the roof of the tank and engaging with the plugs for shifting them from the openings to cause a discharge of the glass, a spout extending in the tank for the reception of the glass discharged from the trough, means mounted upon the lower portion of the bottom for collecting the drippings as the glass is discharged from the trough into the spout, and heating means for the drippings extending in the tank in proximity to the lower portion of said bottom.

8. A glass tank including a bottom and a roof, one portion of the bottom arranged at a lower level than the other portion, a glass containing portion seated upon the higher portion of said bottom and provided with an outlet opening, a shiftable plug extending in said opening for closing it, a lever projecting through the roof of the tank and adapted when operated to shift the plug and said opening to permit of the discharge of the glass from the trough, means mounted upon the roof for operating the lever, means extending in the tank for conducting the glass as it is discharged from the trough, and means at the lower portion of said bottom for collecting the drippings as the glass is discharged from the trough into said conducting means.

9. A glass tank including a bottom and a roof, one portion of the bottom arranged at a lower level than the other portion, a glass containing portion seated upon the higher portion of said bottom and provided with an outlet opening, a shiftable plug extending in said opening for closing it, a lever projecting through the roof of the tank and adapted when operated to shift the plug from said opening to permit of the discharge of the glass from the trough, means mounted upon the roof for operating the lever, means extending in the tank for conducting the glass as it is discharged from the trough, means at the lower portion of said bottom for collecting the drippings as the glass is discharged from the trough into said conducting means, and heating means for the drippings extending in the tank in proximity to the lower portion of said bottom.

10. A glass tank including a bottom and a roof, one portion of the bottom arranged at a lower level than the other portion, a trough seated upon the higher portion of said bottom and having a plurality of glass containing compartments each provided with a longitudinally extending conical shaped outlet opening, conical shaped plugs for closing said openings, levers extending through the roof of the tank and connected to said plugs for shifting them from the openings to permit of the discharge of the glass from one compartment into the other and from the trough, means for operating said levers to shift the plugs, means extending in the tank for conducting the glass as it is discharged from the trough, and means at the lower portion of said bottom for collecting the drippings as the glass is discharged in said conducting means.

11. A glass tank including a bottom and a roof, one portion of the bottom arranged at a lower level than the other portion, a trough seated upon the higher portion of said bottom and having a plurality of glass containing compartments each provided with a longitudinally extending conical shaped outlet opening, conical shaped plugs for closing said openings, levers extending through the roof of the tank and connected to said plugs for shifting them from the openings to permit of the discharge of the glass from one compartment into the other and from the trough, means for operating said levers to shift the plugs, means extending in the tank for conducting the glass as it is discharged from the trough, means at the lower portion of said bottom for collecting the drippings as the glass is discharged in said conducting means, and heating means for the collecting drippings.

12. A glass tank including a bottom and a roof, one portion of the bottom arranged at a lower level than the other portion, a trough seated upon the higher portion of said bottom and having a plurality of glass containing compartments each provided with a longitudinally extending conical shaped outlet opening, conical shaped plugs for closing said openings, levers extending through the roof of the tank and connected to said plugs for shifting them from the openings to permit of the discharge of the glass from one compartment into the other and from the trough, means for operating said levers to shift the plugs, means extending in the tank for conducting the glass as it is discharged from the trough, means at the lower portion of said bottom for collecting the drippings as the glass is discharged in said conducting means, and heating means for the collecting drippings combined with a waste pit and with means whereby the drippings are conducted to the waste pit.

In testimony whereof I affix my signature in the presence of two witnesses.

CHARLES C. ROSS.

Witnesses:
A. HIRSH,
S. T. MITCHELL.